(No Model.)  7 Sheets—Sheet 1.

T. A. TRENT, Jr.
TYPOGRAPHICAL ADDING MACHINE.

No. 591,900. Patented Oct. 19, 1897.

(No Model.) 7 Sheets—Sheet 4.

T. A. TRENT, Jr.
TYPOGRAPHICAL ADDING MACHINE.

No. 591,900. Patented Oct. 19, 1897.

UNITED STATES PATENT OFFICE.

THOMAS A. TRENT, JR., OF OSCEOLA, IOWA.

TYPOGRAPHICAL ADDING-MACHINE.

SPECIFICATION forming part of Letters Patent No. 591,900, dated October 19, 1897.

Application filed March 2, 1897. Serial No. 625,791. (No model.)

*To all whom it may concern:*

Be it known that I, THOMAS A. TRENT, Jr., a citizen of the United States, residing at Osceola, in the county of Clark and State of Iowa, have invented a new and useful Typographical Adding-Machine, of which the following is a specification.

The primary object of my invention is to provide an adding-machine, in the use of which a comparatively great speed may be obtained without endangering the absolute accuracy of the work performed by the machine. In the practical use of this class of machines heretofore it has been found that when an operator of average skill would attempt to manipulate the machine at a high speed absolute accuracy was often sacrificed.

Some of the further objects of this invention are to provide a machine in which approximately the same amount of power is required to depress each key, and in which each key has exactly the same length of movement to make a complete stroke, so that an operator after once becoming accustomed to the "touch" of the machine will thereafter depress each key to its limit of stroke, no matter what great speed he is capable of obtaining. Heretofore in machines of this class, where it required more power to depress the keys bearing digits of higher value, it has been found that when high speed was attempted an operator passing from the key of small value to one of greater value would fail to exert the greater amount of power required, and hence cause no impression of the digit to be made and a mistake in the problem in process of completion, and in machines having keys whose length of stroke is not uniform the same objection has been found when high speeds were attempted.

A further object is to provide simple, strong, and durable means in a machine of this class whereby the adding-wheels are positively held when they have passed through an arc corresponding to the value of the number on the key depressed, so that the momentum of the adding mechanism when moving rapidly cannot carry the adding-wheel beyond its proper movement.

A further object is to provide simple, strong, and durable printing mechanism arranged to be operated by and in conjunction with the adding mechanism.

A further object is to provide a carrying device of strong and durable construction for moving the next adding-wheel to the left one digit-space each time that an adding-wheel has been turned ten digit-spaces.

My invention consists in certain details of construction of various parts of the device and in the arrangement and combination thereof to produce the complete machine, as hereinafter set forth, pointed out in my claims, and illustrated in the accompanying drawings, in which—

Fig. 3 shows a transverse sectional view through line 3 3 of Fig. 2. Fig. 13 shows a detail side view of one of the adding-wheels and accompanying parts to illustrate the means for limiting the movement of the adding-wheel upon a depression of the key, taken from the side opposite from that shown in Fig. 2.

Referring to the accompanying drawings, the reference-numeral 10 is used to indicate the side frames of the machine.

11 is used to indicate the rear end plate, and 12 the top plate having a transparent strip 13 therein, through which the adding-wheels may be seen. The total of the numbers recorded by the printing mechanism appears thereon at all times.

14 indicates a cross-bar extending transversely of the machine-frame near its rear end.

Figure 1:
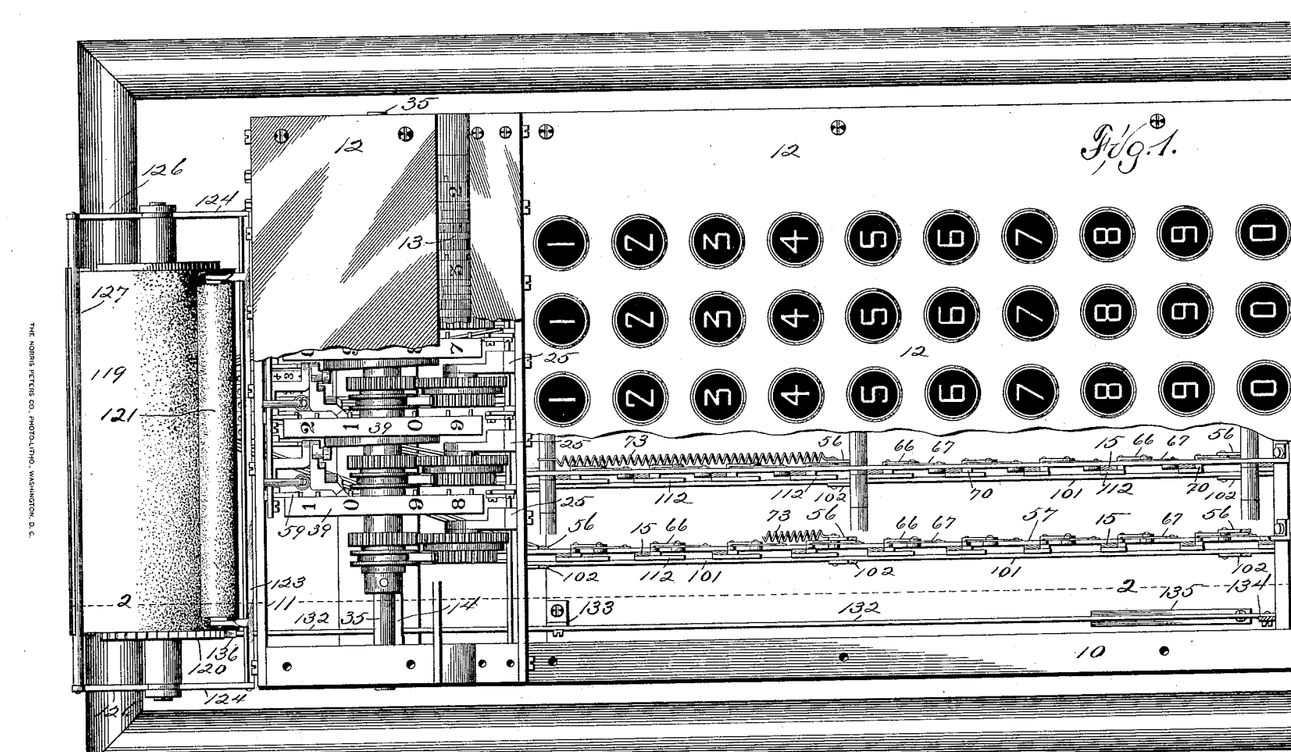
Figure 1 shows a top or plan view of the machine with parts of the cover broken away to show the arrangement and combination of certain mechanisms beneath the cover.

In the general arrangement of the machine there is a complete set of ten digit-bearing keys for each column of which the capacity of the machine is capable of adding. The keys for each column are arranged in a straight line extending from the rear end of the machine to the front end, and numbered consecutively from "1" to "0," as shown in Fig. 1. The mechanisms for transmitting motion from the keys in one line are the same for each of the other lines, no matter what the capacity of the machine may be. In the following description, therefore, I shall describe only the construction, arrangement, and combination of the keys in one line, except so much of the mechanism in the adjoining line as may be necessary to make a complete operation.

The reference-numeral 15 indicates a straight key-bar, angular in cross-section, and mounted to be capable of a vertical movement in an opening in the top 12 and in an opening in a metal plate 16, located near the base of the machine. The contractile spring 17 is placed in an opening in the base of the machine and overlaps the lower end of the key-bar 15, so that when the key-bar is depressed it will again be automatically elevated by the said spring. A pin 18, fixed to the key-bar 15 to engage the lower surface of the said plate, serves to limit the upward movement of the key-bar.

The numeral 19 indicates a lug formed on the key-bar 15, and arranged to engage the plate 16, and thereby limit the stroke of the key-bar. A similar lug 19 is placed on each one of the key-bars at exactly the same distance from its lower end, so that each key-bar must have exactly the same limit of movement.

I shall first describe the means whereby motion is transmitted to the adding-wheel upon a depression of the key and in proportion to the value of the digit marked upon the key.

Figure 2:
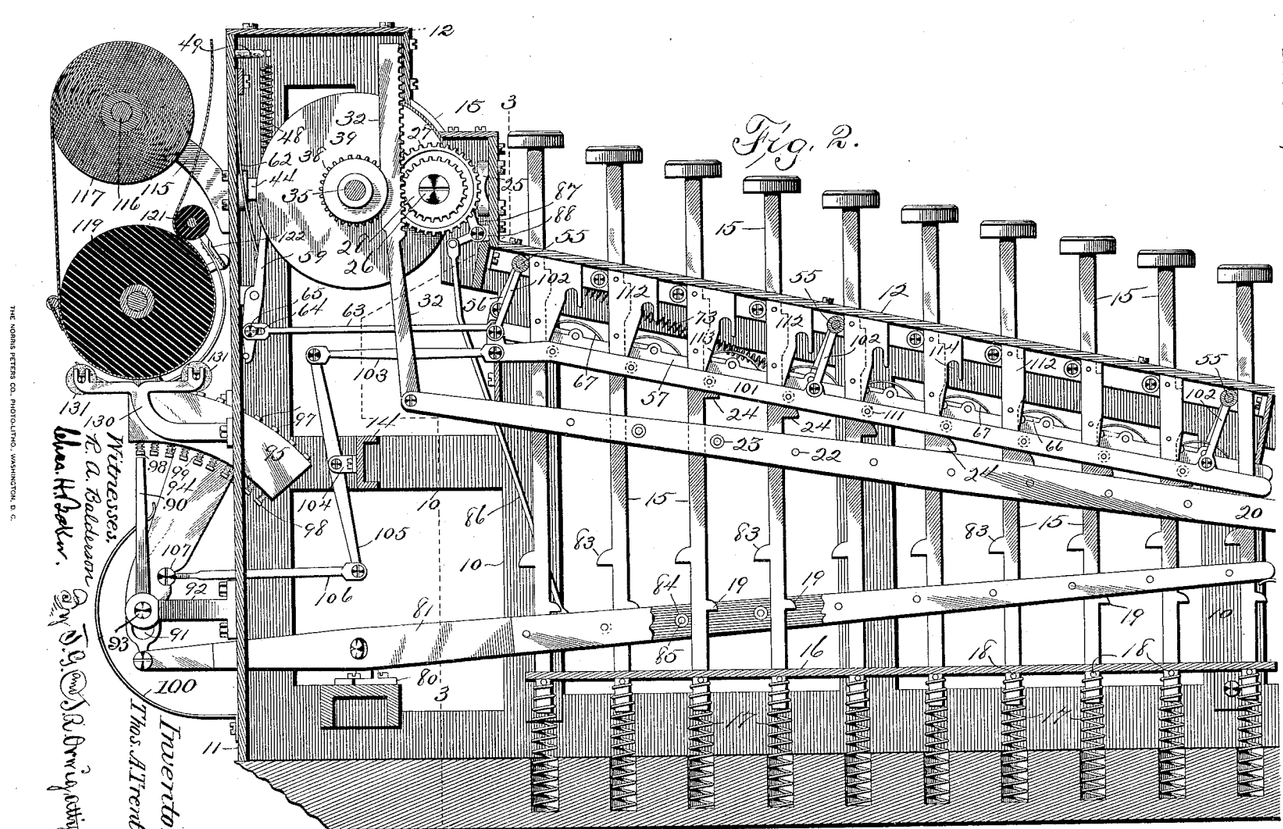
Fig. 2 shows a vertical longitudinal section taken through the line 2 2 of Fig. 1.
Figure 4:
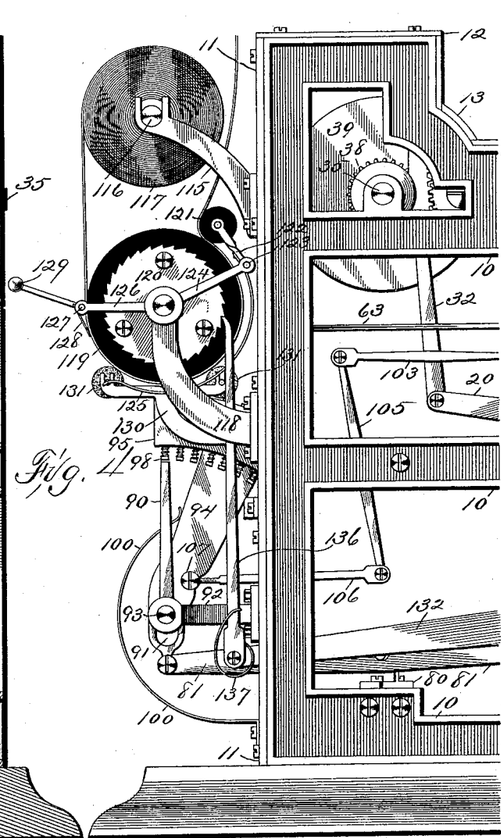
Fig. 4 shows a side elevation of the rear end portion of the machine to illustrate the arrangement of the printing mechanism.
Figure 5:
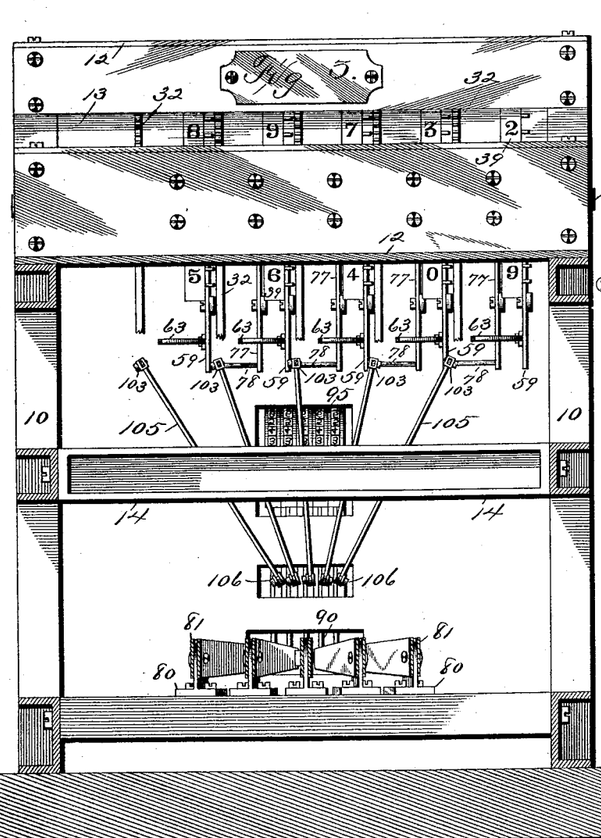
Fig. 5 shows a detail sectional view of the front end of the machine to show the means for pivoting the levers which actuate the adding mechanism.

The reference-numeral 20 indicates a lever pivoted to a shaft 21, extended across the rear end of the machine and mounted in the frame. This lever is composed of two parts connected by means of the rivets 22, and having rollers 23 on said rivets between the parts. A leaf-spring 20ª, fixed to the machine-frame, engages the said lever and normally holds it in an elevated position. A key-bar 15 is extended through this lever 20, and a lug 24 is formed on the key-bar to engage the roller 23 when the key is depressed. It will be noted upon referring to Fig. 2 that the lugs 24 on the bars 15 are placed at different points of elevation relative to the position of the rollers 23. This distance between the lugs 24 and the rollers 23 on the various key-bars is determined by the value of the number carried by the key. The lug 24 on the key-bar bearing the number "1" is farthest from the roller 23 with which it is to engage, so that the lever bearing the digit "1" will have to move through the greater part of its stroke before the lug will engage the roller 23. Hence, when it does engage, the lever 20 will be moved downwardly only a slight distance. The lug on the key bearing the digit "9" is nearest to the roller with which it is to engage, and the key-bar bearing the digit "0" does not have one of the lugs 24, because it does not operate the adding mechanism when depressed. The motion thus transmitted to the rear end of the lever 20 is made to rotate the adding-wheel a certain distance in proportion to the distance it is depressed. I preferably employ the following mechanism for imparting this motion:

The reference-numeral 25 is used to indicate a support detachably fixed to the top 12 of the frame to project horizontally to a position near the adding-wheel.

26 indicates a screw seated in the support 25, and having mounted thereon a cog-wheel 27, having an annular recess on one of its faces.

The numeral 28 indicates a cog-wheel rotatably mounted on the screw 26, and arranged to cover the said annular opening.

29 indicates an integral sleeve on the wheel 28 to engage the screw 26, and to extend as far as the cog-wheel 27. 30 indicates a ratchet-wheel fixed on this sleeve to lie within the said annular space in the wheel 27.

31 indicates a spring-actuated pawl fixed to the wheel 27 to normally engage the ratchet-wheel 30.

32 indicates a rack pivoted to the outer end of the lever 20 and in engagement with the cog-wheel 28. It is obvious that each time the said rack is reciprocated the cog-wheel 27 is rotated a part of a revolution in proportion to the distance through which the rack 32 is moved, and further that the cog-wheel 27 will be moved only in one direction on account of the ratchet device connecting the wheels 27 and 28.

The reference-numeral 35 indicates a shaft fixed in the machine-frame on which the adding-wheels are rotatably mounted. The adding-wheels proper are each composed of a sleeve 36, designed to be loosely mounted on the said shaft 35. On one end of this sleeve are two annular flanges arranged to form an annular groove 37, which serves as a guide for the rack 32. On the other end of the sleeve 36 is a cog-wheel 38, meshed with the cog-wheel 27.

The adding-wheel proper, indicated by the reference-numeral 39, is located at the central portion of the sleeve 36 and has a laterally-projecting annular flange 40 at its periphery. In the space at the side of the wheel protected by this flange there is located a device for carrying from one wheel to the other, and which comprises a ratchet-wheel 41, rotatably mounted upon the sleeve 36, and 42 indicates a spring-actuated pawl pivoted to the wheel 39 to engage the ratchet-wheel 41 and to prevent its movement in one direction, and fixed to the outer surface of this wheel 41 is a segmental bevel-gear 43.

Figure 15:
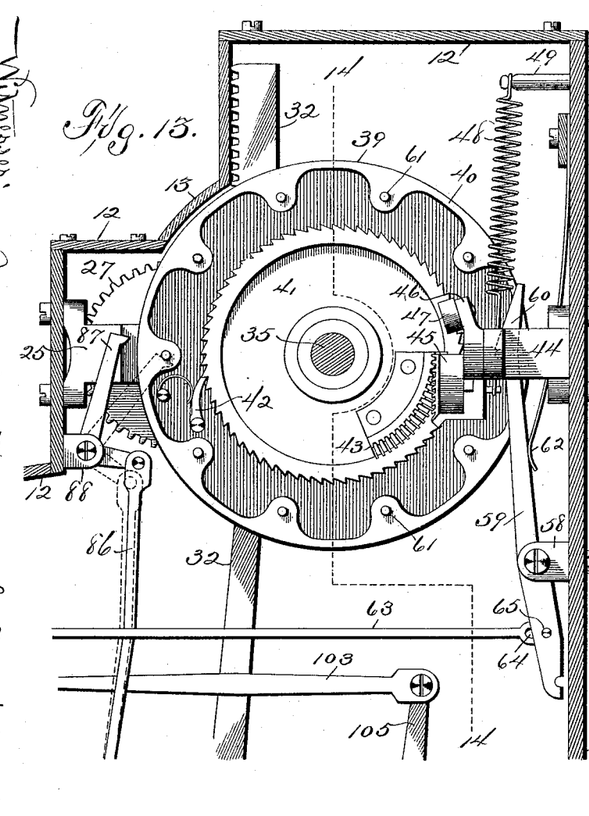
Fig. 15 shows a top or plan view of a series of adding-wheels and certain connected parts, showing said adding-wheels in different positions, to illustrate the means for carrying from one wheel to the next adjoining wheel to the left, taken from the side opposite from that shown in Fig. 2.
Figure 16:
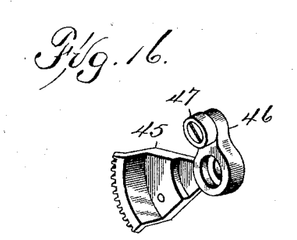
Fig. 16 shows a perspective view of the segment by which motion is transmitted from the cam on one adding-wheel to the next adjoining adding-wheel to the left.
Figures 17, 18:
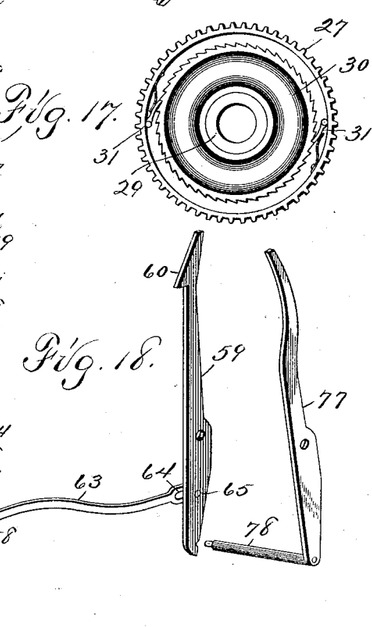
Fig. 17 shows a detail side view of the wheel for transmitting motion to the adding-wheel as it would appear with the wheel that is actuated by the rack on the key-levers removed therefrom.
Fig. 18 shows a detail perspective view of the lever for engaging the adding-wheel and preventing its rotation beyond a certain predetermined movement, and also showing the lever in its position relative thereto, whereby the first-mentioned lever is held out of engagement with the adding-wheel when the next adding-wheel to the right has performed one complete revolution, and hence is in a proper position for operating the last-mentioned lever.

The reference-numeral 44 indicates a support fixed to the rear end of the frame of the machine, and extended inwardly in a horizontal plane between two of the adding-wheels. 45 indicates a segment pivotally mounted on this support 44, and designed to normally engage the segment 43. 46 indicates an arm projecting upwardly from the said segment near its pivotal point, where it is provided with an antifriction-roller 47, and 48 indicates an extensile spring attached at one end to the segment 45 and at its other end to a support 49, fixed to the rear end of the machine-frame. Thus when released the segment 45 will be automatically elevated, and the ratchet-wheel 41 be turned a distance corresponding to one digit-space of the adding-wheel. On the opposite side of the adding-wheel is an outwardly-projecting annular rim 50, the outer edge of which has a cam-surface, which cam is normally engaged by the roller 47 on the segment 45 of the adjoining wheel. By this arrangement when the adding-wheel 39 has moved ten digit-spaces the roller 40 will have been operated sufficiently to move the segment 45, with which it is connected, a distance which will be sufficient to move the segment 43 and ratchet-wheel 41, and the adding-wheel 39, with which said ratchet-wheel 41 is connected, a distance corresponding to one digit-space. Hence, when one adding-wheel is moved ten digit-spaces the next adding-wheel to the left is moved one digit-space. The said pawl 42 is so arranged relative to the adding-wheel 39 that the ratchet-wheel 41 will not move the adding-wheel 39 while the segment 45 is operated against the pressure of the spring 48, but as soon as the roller 47 has passed beyond the highest point of the cam 50 the spring 48 will elevate the segment 45, and this movement will rotate the adding-wheel 39 a distance corresponding to one digit-space. Upon referring to Fig. 15 it will be noted that the highest point on the cam 50 is adjacent to the position of the numeral "1" on the adding-wheel. Hence the movement which operates the next adjoining adding-wheel will be accomplished immediately after the first adding-wheel has been rotated ten digit-spaces. I have provided a device for holding the roller 47 close to the cam-surface 50 during the time that the said roller is passing over the highest point on the cam to its lowest point. This device comprises an arm 51, fixed to the side of the adding-wheel 39, and having a guide 52 thereon in position to engage the roller 47 as soon as it has passed from the highest point on the cam 50. This device is only of use when the adding-wheel is being rotated very rapidly, and serves to prevent the roller 47 from flying off at the highest point of the cam 50.

From the foregoing description it will be seen how motion is transmitted to the adding-wheel, as required to rotate it a distance proportioned to the value of the number on the key depressed, and also the device for rotating the next adding-wheel to the left each time that the adding-wheel has rotated ten digit-spaces.

I shall next describe the means whereby the adding-wheel is positively stopped at the proper position, so that it may not attain a momentum when a key has been rapidly depressed, which momentum will be sufficient to carry it beyond the point where it should have stopped. This mechanism comprises two or more shafts 55 to extend transversely of the machine-frame beneath the top plate 12. Pivotally mounted on these shafts 55 are the arms 56. These arms 56 are in turn pivoted to a flat bar 57, that extends longitudinally of the machine-frame and parallel with the top 12. I have provided means for operating this bar 57 as required to give it a forward movement upon the depression of any key, and this forward movement serves to operate a device which will release the adding-wheel during the depression of the key and again automatically engage and hold it as soon as the key has started to move upwardly. This device, which is clearly illustrated in Fig. 13, comprises a lug 58, fixed to the rear end plate of the machine, and having a lever 59 pivoted therein. At the top of said lever is a hook 60, designed to engage the pins 61. These pins 61 are fixed to the side of the adding-wheel and project laterally therefrom, and are located at regular distances apart, with one for each digit-space. The upper end of this lever 59 is normally held in a position in engagement with the pins 61 by means of the spring 62.

63 indicates a connecting-rod pivoted to the forward end of the bar 57, and having a longitudinal slot 64 in its opposite end to engage a screw 65, fixed to the lower end of the lever 59. By this arrangement the lever 59 will be operated upon the movement of the bar 57, as required to release the adding-wheel. I have provided means whereby the lever 59 is thrown into engagement with the pins 61 on the adding-wheel as soon as the key-bar has been depressed to its lower limit, as required to stop the rotation of the adding-wheel at this point.

Figures 6, 7:
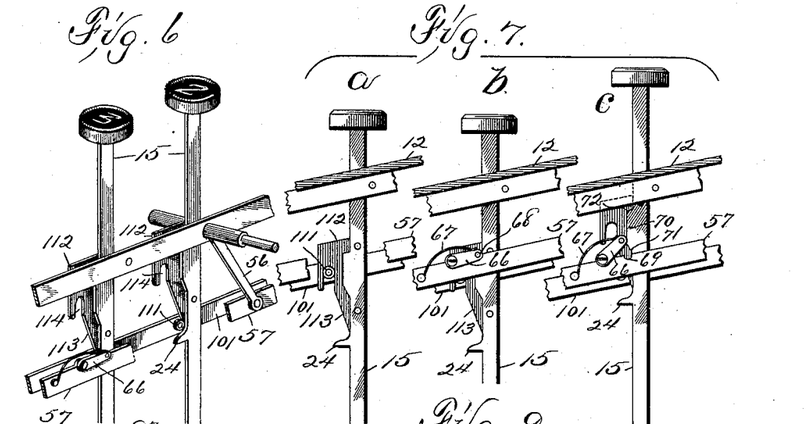
Fig. 6 shows a detail perspective view of two of the key-bars and connected parts to show the means for operating the printing devices, taken from the side opposite from that shown in Fig. 2.
Fig. 7 shows an enlarged detail view of a portion of the key and connected parts, taken from the side opposite from that shown in Fig. 2. *a* illustrates the means by which the bar that actuates the printing mechanism will be prevented from moving too far when the key is rapidly depressed. *b* illustrates the mechanism by which the bar that actuates the adding-wheel-releasing mechanism is moved rearwardly when the key is depressed to thereby operate the adding-wheel-holding device. *c* illustrates the means by which the key may be elevated without moving said bar forwardly.

Referring to Fig. 7, $b$, I have used the reference-numeral 66 to indicate a pawl pivoted to the top of the bar 57 to normally hold downwardly against the bar by means of a spring 67, which is also fixed to the bar 57. On the free end of the pawl 66 is a pin 68, which projects laterally beyond the opposite edge of the bar 57, opposite to that to which the pawl is pivoted. This pin 68 normally rests in a notch 69 in the top of the said bar. On each of the key-levers I have provided a rearward projection 70, having an inclined plane 71 at its lower end and an abrupt shoulder 72 at its upper end. An extensile spring 73 is connected with this bar 57 to normally hold it to the rearward limit of its movement. In practical operation, when the key-bar is depressed, the inclined plane 71 will first engage the pin 68 of the pawl 66, and thereby force the bar 57 forwardly as far as the length of the inclined plane 71. This forward movement of the bar 57 is sufficient to draw the lever 59 out of engagement with the pin 61, and thus permit a rotation of the adding-wheel. When the key-bar is depressed to its limit, the pin 68 will pass the shoulder 72 and assume the position shown in $b$, Fig. 7. When this pin 68 passes from the forward surface of the lug 70 over the shoulder 72, the bar 57 is drawn forwardly by means of a spring 73, and the lever 59 is released, so that its spring 62 may operate to throw it in engagement with the pin 61. This action, it will be seen, will take place immediately upon the event of the key-bar reaching the lower limit of its stroke, and hence the adding-wheel cannot rotate beyond its proper movement. When the key-bar is again elevated by means of its spring, the pawl 66 will be elevated against the force of its spring 57 and assume the position shown in $c$, Fig. 7, which illustrates the position of the parts as they would appear when the key-bar has been elevated a slight distance only and before it has finished its upward movement.

In this connection I shall describe the means whereby the next carrying-wheel to the left is released from the lever 59 when the adding-wheel has made a complete circle, or passed through ten digit-spaces, and the carrying mechanism is in readiness to move the said next adding-wheel to the left one digit-space. On each of the adding-wheels, except the last one in the series, I have fixed a small roller 75.

76 indicates a support fixed to the rear end plate of the frame and having a lever 77 pivoted thereto. The upper end of this lever is in a position to be engaged by said roller 75 upon each revolution. Thus, when the roller 75 engages the lever 77, the adding-wheel must have passed through a complete revolution or ten digit spaces and be ready to transmit its motion to the next adjoining adding-wheel to the left.

The numeral 78 indicates a rod fixed to the lower end of the lever 77 to normally engage the lower end of the lever 59. Hence when the lever 77 is actuated, as before indicated, the lever 59 will be moved to release the adding-wheel and permit it to turn. The slot 64 in the connecting-rod 63 provides means whereby the lever 59 may move for this purpose without moving the said rod 63. The lever 59 will again engage the pin 61 on the adding-wheel as soon as the roller 75 has passed out of engagement with the lever 77. In this connection I shall also describe an additional device for stopping the rotation of the adding-wheels immediately upon the stoppage of the key-bar. This mechanism is not dependent for its action upon springs, and, further, it does not hold the adding-wheel in position, but it does provide additional security against a possible movement of the adding-wheel beyond the point where such movement should stop. This said device is connected with the lever that operates the printing mechanism. Hence a portion of this printing mechanism must be first described in order to illustrate the operation of the device.

The reference-numeral 80 indicates a support fixed to a part of the machine-frame near its lower rear end.

81 indicates a lever made of two parts and pivoted to the support 80. Its one end projects through an opening in the rear plate of the machine, and its other end extends forwardly within the machine to a point beyond the last key-bar. A spring 82 is fixed to the machine-frame to normally hold the said forward end of the lever in an elevated position. This lever 81 is actuated upon the depression of each key by means of the lugs 83, formed on the key-bars, and arranged to engage the rollers 84, mounted on the rivets 85 between the parts of the lever 81. The lugs 83 on the key-bar at the rear end of the machine are farther from the rollers 48 than are those on the key-bar at the forward end of the machine. This arrangement is made necessary because the key-bars as they approach the rear end of the machine are closer to the pivotal point of the lever 81. Hence the key-bar at the rear end of the machine need only operate the lever a slight distance in order to move the hammer 90 the same distance as would be moved by the key-bar at the front end of the machine moving the lever 81 a considerably greater distance downwardly, and it is desired that each key-bar will move the lever a similar distance. It is to be understood that the number of levers 81 correspond with the number of rows of keys.

The mechanism that is connected with the aforesaid levers for stopping the rotation of the adding-wheels comprises a rod 86, pivoted to the lever 81, and a bell-crank lever 87, fulcrumed to a support 88 on the machine-frame. The upper end of this bell-crank lever 87 is arranged to intercept the path of the pins 61. Hence, when the rod 86 is pulled downwardly, the bell-crank lever 87 will engage the pin 61, and thereby stop the rotation of the adding-wheel. This lever 87 will, of course, be withdrawn from engagement with the pin as soon as the key-bar is elevated, but it will serve to positively stop the adding-wheel when the key has been depressed to its full limit, and inasmuch as this device operates independently of the other device for stopping the rotation of the adding-wheel an additional safeguard is provided. Neither one of said devices is dependent upon the same mechanism for its operation, and hence should one of them become displaced, so as to be inaccurate, the other might operate and preserve the absolute accuracy of the machine.

I shall next describe the construction and operation of the printing mechanism.

I have hereinbefore shown how the lever 81 is operated upon the depression of any key. On the outer end of each of said levers 81 is a straight hammer 90, pivotally connected therewith, and having near its lower end a slot 91.

92 indicates a support fixed to the rear end plate of the machine-frame, and having a horizontal shaft 93 fixed in its outer end. The said shaft 93 is passed through the said slot 91, and by this means the hammer 90 is made to move in a vertical plane.

Figure 8:
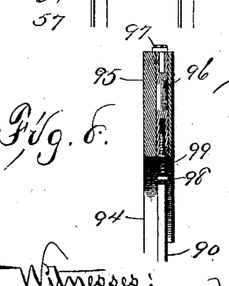
Fig. 8 shows a transverse sectional view through one of the type-bearing segments.
Figure 9:
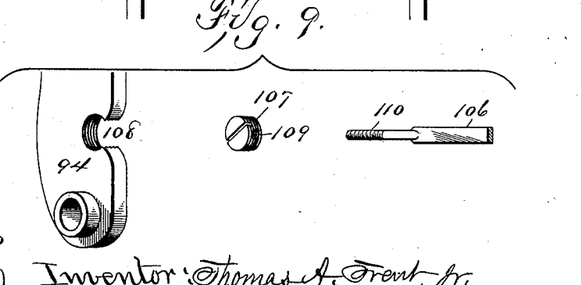
Fig. 9 shows a perspective view of the device for connecting one of said type-bearing segments with a lever, said parts being shown in a detached position.
Figure 10:
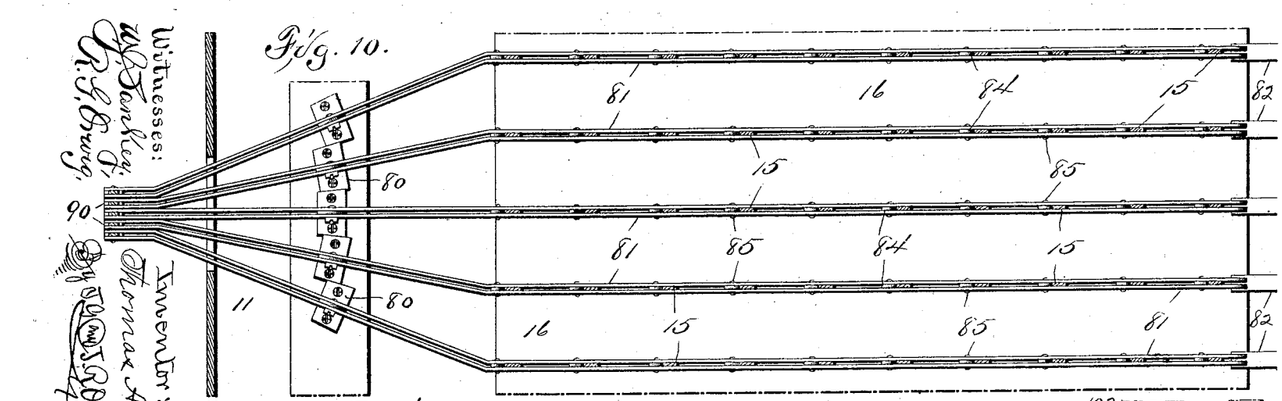
Fig. 10 is a plan view of the type-operating bar.
Figure 11:
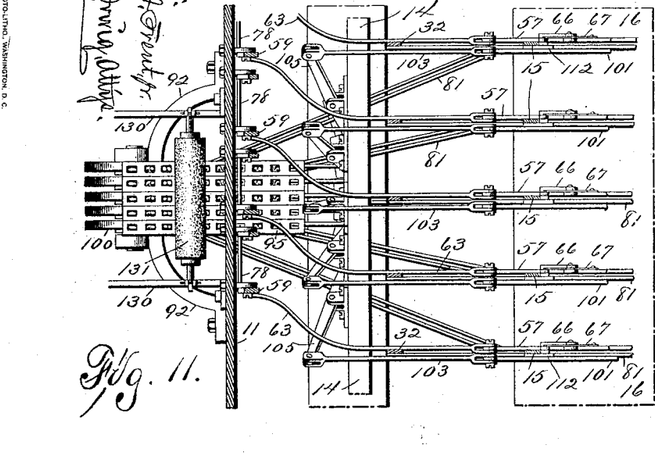
Fig. 11 shows a detail plan view of the mechanisms for imparting motion from the key-bar to the printing and adding mechanism.
Figure 12:
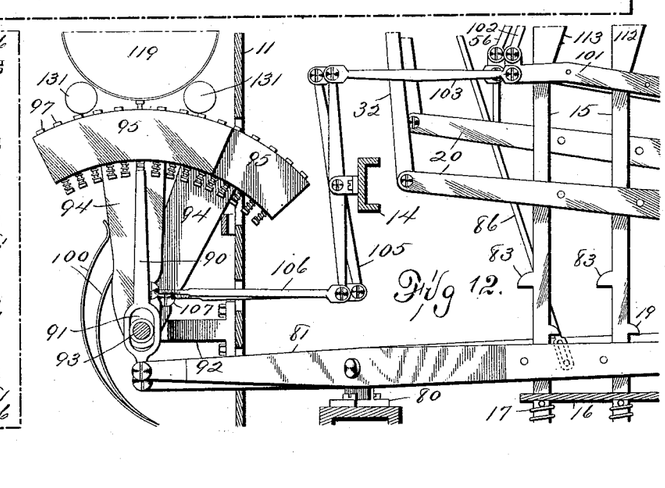
Fig. 12 shows a detail side view to illustrate the operation of the printing mechanism.
Figure 14:
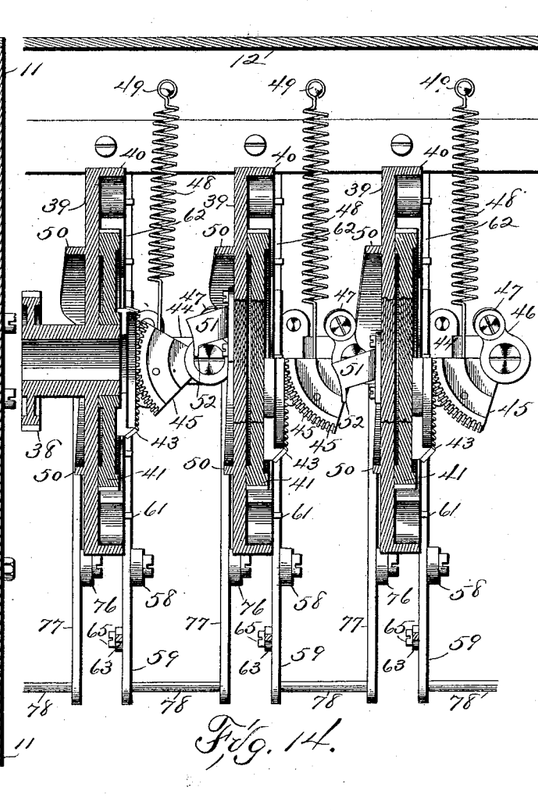
Fig. 14 shows a transverse sectional view through the line 14 14 of Fig. 13 and in which the carrying device is shown in several different positions to illustrate its operation in connection with the other parts.

The device for bearing the types comprises an arm 94, pivotally mounted on the shaft 93, and having formed on or fixed to its top a segmental rim 95, which projects laterally a slight distance from one side of the arm 94. This construction is clearly shown in Fig. 8. In each of these segmental rims 95 I have mounted ten types, arranged in the order of their value, beginning at the front end with "1" and then continuing on an ascending scale to "9," and the one on the rear end bears the numeral "0." Each type is fixed in a slide 96 to extend vertically through the segmental rim, and having the type 97 fixed in its top, and a screw 98 inserted in a screw-threaded opening in its lower end.

99 indicates a spring coiled upon said screw with its one end in engagement with the head of the screw, and its other end in engagement with the under surface of the segmental rim. It is obvious that when the type is raised the said spring will automatically draw it downwardly. I have arranged the segmental rim and the type-slides therein in such a position relative to the hammer 90 that when the hammer is moved upwardly it will strike the head of the screw 98, and thus cause the type 97 to print. The type-bearing segment is normally held to its forward limit—that is, in a position with the slide bearing the type "0" directly above the hammer—by means of the spring 100, which is fixed to the rear plate of the machine with its end in engagement with the rear surface of the arm of the segmental rim. I have provided means whereby the said segmental rim is moved upon the depression of any key into such a position that the number borne by the key will correspond with the number borne by the type which is placed in position directly over the hammer 90. This mechanism comprises a bar 101, mounted beneath the top of the machine to extend in a plane parallel therewith, and supported on the hangers 102, which hangers are mounted upon the shafts 55.

103 indicates a pitman pivoted to the forward end of the bar 101.

104 indicates a support pivoted to the cross-piece of the frame 14, and having a lever 105 pivoted therein. The upper end of this lever 105 is pivotally connected with the pitman 103, and a rod 106 is pivoted to the lower end of the lever 105, and its other end is connected with the arm of the type-bearing segment in the following manner.

107 indicates a screw of a length corresponding with the thickness of the arm of the type-bearing segment. A screw-threaded opening 108 is formed in the said arm. One side of the opening 108 at the forward edge of the arm is open.

109 indicates a screw-threaded opening formed in the side of the screw 107, designed to receive the screw-threaded end 110 of the rod 106. By this arrangement the oscillating movement imparted to the rod 106 may be transmitted to the arm of the type-bearing segment which moves in the segment of a circle without bending the rod 106. The screw 107 is capable of a slight movement within the opening 108, and this provides the necessary flexion between these parts. It is obvious that the length of stroke imparted to the bar 101 will determine which one of the types will be moved into position above the hammer 90. I have provided means whereby a depression of each key will move the bar 101 a different distance—that is, a distance in proportion to the value of the number borne by the key—as follows:

111 indicates a roller fixed to the side of the bar 101, adjacent to the key.

112 indicates a plate fixed to the key, and having an inclined surface 113 on its one edge designed when the key is depressed to engage said roller and thereby force the bar 101 forwardly. At the top of this inclined plane is an opening 114, into which the roller 111 is admitted when the key has been depressed to its limit. This prevents the bar 101 from moving rearwardly beyond the proper distance. In some of the plates 112 it will be noted that the opening 114 is dispensed with, but this is done only on the plates which operate the bar 101 only a slight distance, and hence the probability of the bar 101 moving too far is not present. It will be noted upon reference to Fig. 2 that the incline 113 is longer and more acute on the plates 112, which bear the digits of smallest value, and that this is graduated toward the forward end of the machine where the key-bars bear numerals of greater value. The spring 100 operates indirectly to hold the bar 101 to its forward limit.

In practical use, the parts just described are arranged with relation to each other in such a manner that a depression of a key will cause the type-bearing segment to first move to its proper position, so that the type corresponding with the key depressed will assume a position directly above the hammer 90. Immediately following this movement the lug 83, which is in engagement with the lever 81, will operate to depress the said lever and thereby force the hammer 90 upwardly into contact with the screw 98, which will print the number borne by the type upon the paper.

The mechanism for holding a roll of paper and for causing an upward movement of the type to print upon the paper comprises a bracket 115, fixed to the rear face of the machine-frame to support a shaft 116, on which is mounted a roll of paper 117.

118 indicates brackets also fixed to the rear plate of the machine-frame below the aforesaid brackets. In the upper ends of these brackets 118 I have mounted a roller-platen 119, having on one end thereof a ratchet-wheel 120.

121 indicates a tension-roller arranged to engage the platen 119, and supported in the arms 122, projecting from a shaft 123. This shaft is mounted in the arms 124, which in turn are pivoted to the axle of the roller-platen.

125 indicates guides fixed to the shaft 123, to partially encircle a platen-roller.

126 indicates arms pivoted to the shaft of the platen-roller, and having a shaft 127 pivoted in their outer ends. On this shaft is a plate 128, arranged to engage the roller-platen, and hold the paper thereon in contact therewith.

129 indicates a weighted lever also fixed to the shaft 127 to automatically hold the plate 128 to the roller-platen. The paper from the roller 117 is passed under the roller-platen and between the platen of the tension-roller with its end extended upwardly.

I have provided means for inking the types as follows: 130 indicates bifurcated arms fixed to the rear plate of the machine to extend directly above the segmental type-bearing rims. In each end of these arms I have mounted the inking-rollers 131 in a position to be engaged by the types as the segmental type-bearing rims are operated.

The roller-platen is moved one line-space upon the depression of a key by means of the following mechanism: 132 indicates a lever fulcrumed to a support 133, near the base of the machine, and having a key-bar 134 pivoted to its rear end. A spring 135 normally elevates the rear end of this lever. 136 indicates a pawl pivoted to the rear end of this lever 132, and is normally held in engagement with the ratchet-wheel 120 by means of a spring 137.

As a sample of the practical operation of the machine, we will assume that it is desired to add the numbers "225" and "900." To start the addition, we begin in the hundreds-column—that is, the third column from the right-hand side of the machine—and find the key bearing the digit "2." This key is then depressed and the corresponding key in the tens-column is then depressed, and the key bearing the digit "5" in the units-column is then depressed. Assuming that each of the adding-wheels was placed in position originally, so that the ciphers all appeared through the glass plate 13 at the top of the machine, the result of the depression of each of these keys will be to move the adding-wheel in the particular column in which they are arranged so that the number "225" will appear on the three adding-wheels at the right-hand side of the machine, and at the same time the number "225" will have been printed upon the paper. The key which operates the pawl 136 is then depressed and the paper advanced on the platen one line-space. The key bearing the numeral "9" in the hundreds-column is next depressed. The adding-wheel in the hundreds-column had previously been moved through two spaces, and the movement of this adding-wheel through nine digit-spaces will obviously move the adding-wheel more than a complete revolution since the commencement of the addition. This movement will cause the cam 50 to operate the roller 47 and the segmental gear 45, and an operation of this gear will, as hereinbefore described, move the next adding-wheel to the left one digit-space. This movement of the adding-wheels will cause the number "1" to appear through the glass 13 on the hundreds-column, and also the number "1" to appear on the adding-wheel of the tens-of-hundreds column, and in addition to this the numeral "9" will have been printed in the hundreds-column on the paper. To complete the printing of the sum upon the paper, it is necessary to depress the keys bearing the digit "0" in the tens and the units columns. The depression of these keys will not operate the adding mechanism because the key-bar bearing the said digit is not provided with one of the lugs 24, which are necessary in operating the adding mechanism. We now have the sum printed upon the paper and arranged in proper form, and we also have the total appearing on the adding-wheels through the glass 13. We set down the total by simply operating the key-bars corresponding with the total—that is, the key bearing the digit "1" in the tens-of-hundreds column, the same key in the hundreds-column, key number "2" in the tens-column, and number "5" in the units-column. Thus a complete addition is made and the sum with its total appears on the paper. The adding-wheels have been operated as required to add to the numbers the total, and in beginning a new addition it is only necessary to depress such of the keys as will bring all of the adding-wheels to a position in which the numeral "0" appears thereon through the glass 13.

I have stated hereinbefore that the amount of power required to depress each key was approximately the same. We will assume that each of the adding-wheels is in such a position that the number "9" thereon will appear through the glass 13, and it is obvious that an operation of any key in the units-column will necessarily move every adding-wheel on the machine, however this key may be depressed, with the same amount of power that is required to depress any key at any stage of the proceedings. It will be understood from the previous description of the parts that enter into this carrying mechanism that the cam 50 is arranged on the adding-wheel in a gradually-ascending plane through an entire circle, and that upon the depression of any key the segment 45 is moved downwardly, and the wheel 41 within the adding-wheel is moved a corresponding distance. When the numeral "9" is in position to show through the glass 13, the roller 47 is at the end or highest point of the cam 50. Then when the adding-wheel is moved the roller will pass downwardly on the incline of the cam—that is, toward the adding-wheel—and the segment 45 will be released from the influence of the cam. At this point the spring 48 will serve to again elevate the segment 45 which was depressed during the proceeding of the addition, and this movement of this spring is what operates the next adding-wheel to the left. Thus, when the first adding-wheel on the right-hand side of the machine has been moved so that the roller 47 will pass beyond the end of the cam, each of the other adding-wheels in the series will be moved automatically by the spring 48, and hence no further power is necessary. I have provided means whereby a depression of the key-bar 1 and a depression of the key-bar 9 will require approximately the same amount of force. It is obvious, of course, that to move the adding-wheel through nine-tenths of a revolution, which is necessary when the key-bar 9 is depressed, will require more power than to move the adding-wheel to one-tenth of the revolution which occurs when the key 1 is depressed. To counterbalance this objectionable feature, I have arranged the type-bearing segment in such a position that to print the numeral "1" it is necessary to move the segment through the greatest arc of which it is capable. Hence more power is required to print the numeral "1" than to print the numeral "9." I have combined this adding mechanism and this printing mechanism to be operated by the same motion, and as they work in opposition to each other, it will be seen that each key may be depressed by approximately the same amount of force.

I claim—

1. In an adding-machine having a series of adding-wheels, the combination of a lever for each adding-wheel made of two parallel parts pivoted at the forward end portion of the machine-frame, a rack pivoted to the rear end of each of said levers, a series of rollers between the levers, means whereby the corresponding adding-wheel is rotated a distance corresponding to the length of stroke of the rack, a spring for normally elevating each lever, a series of key-bars for each of said levers, each series being passed through its corresponding lever and slidingly mounted in a vertical position, and a lug on each one of each of said series of key-bars located in a position thereon farther from the lever in proportion as the value of the number of the key decreases so that each key-lever may be depressed the same distance and yet the lever be moved a distance corresponding to the value of the number on the key depressed.

2. In an adding-machine, the combination of a shaft, a series of adding-wheels rotatably mounted thereon, independent means of rotating each adding-wheel any desired part of a revolution, a cam on the left-hand side of each wheel, except the last to the left, a segment pivoted to a fixed support, a roller connected with the segment to be engaged by said cam, an extensile spring for normally elevating the segment, a ratchet-wheel mounted on the right-hand side of each adding-wheel, a pawl on the adding-wheel in engagement with said ratchet-wheel, a segmental gear fixed to the ratchet-wheel and normally engaged by the aforesaid segment, the said parts being so arranged that the ratchet-wheel will be moved relative to the adding-wheel when the pivoted segment is moving in a direction opposite from the direction of force of its spring, for the purposes stated.

3. In an adding-machine, a device for automatically stopping the adding-wheels when they have completed their desired movement, comprising a bar suspended from a fixed support and capable of an oscillating movement, an extensile spring connected with the bar and with a fixed support in the rear of its point of connection with the bar, a lever pivoted to the machine-frame and having a hook on its upper end, a pitman for connecting it with said bar, an adding-wheel having a stop adjacent to each number thereon in position to be engaged by said hook, a forward projection on each key having an inclined lower edge, a vertical front edge, and a horizontal top, a pawl pivoted to the said oscillating bars adjacent to each of said projections, a pin on the pawl to be engaged by said projection, and a spring for holding each pawl downwardly, all arranged and combined to operate in the manner set forth, and for the purposes stated.

4. In an adding-machine, a device for automatically stopping the adding-wheels when they have completed their desired movement, comprising a bar suspended from a fixed support and capable of an oscillating movement, an extensile spring connected with the bar and with a fixed support in the rear of its point of connection with the bar, a lever pivoted to the machine-frame and having a hook on its upper end, a pitman for connecting it with said bar, an adding-wheel having a stop adjacent to each number thereon in position to be engaged by said hook, and mechanism whereby upon the depression of any key the aforesaid hook will be disengaged from the stop on the adding-wheel and when the key has reached its limit the said lever will be again thrown into contact with the stop on the adding-wheel, substantially as, and for the purposes stated.

5. In an adding-machine, the combination of two or more adding-wheels, stops thereon adjacent to each number on the adding-wheel, a roller on each adding-wheel, a lever fulcrumed to a fixed support to be engaged by said roller, a rod fixed to the lower end of the said lever to extend laterally, a hook-lever fulcrumed to a fixed support in position to engage the stops on the adding-wheel adjacent to the one whose roller engages the first-mentioned lever, and a spring for normally holding the hook-lever in engagement with the stops on the adding-wheel, said parts being so arranged that when the first adding-wheel to the right has been moved one complete revolution its roller will engage the first lever and force it outwardly and thereby cause the second lever to also be forced outwardly from engagement with the stops on the adding-wheel, for the purposes stated.

6. In an adding-machine, the combination of two or more adding-wheels, stops thereon adjacent to each number on the adding-wheel, a roller on each adding-wheel, a lever fulcrumed to a fixed support to be engaged by said roller, a rod fixed to the lower end of the said lever to extend laterally, a hook-lever fulcrumed to a fixed support in position to engage the stops on the adding-wheel adjacent to the one whose roller engages the first-mentioned lever, and a spring for normally holding the hook-lever in engagement with the stops on the adding-wheel, said parts being so arranged that when the first adding-wheel to the right has been moved ten digit-spaces its roller will engage the first lever and force it outwardly and thereby cause the second lever to also be forced outwardly from engagement with the stops on the adding-wheel, a rod having a slot in one end, a screw passed through said slot into the lower end of the hook-lever, and means for moving said rod upon the depression of any key, substantially as, and for the purposes stated.

7. In an adding-machine, a device for stopping the rotation of the adding-wheels at a proper point, comprising a bar suspended from a fixed support and capable of an oscillating movement, a forward projection on each key-lever substantially as shown and described, a spring-actuated pawl on the bar adjacent to each of said projections substantially as shown and described, a yielding pressure device for holding the said bar to its rearward limit, a rod pivoted to the rear end of said bar and having a slot in its end, a lever fulcrumed to the rear of the machine-frame and having a hook at its top, a screw passed through said slot into the lower end of said lever, an adding-wheel having a series of stops thereon to be engaged by the hook on said lever, a second lever fulcrumed to the same support, a rod on its lower end to engage the rear lower edge of the first lever, a second adding-wheel located to the right of the first, and a roller thereon to engage the last-mentioned lever, all arranged and combined substantially in the manner set forth, and for the purposes stated.

8. In a printing attachment for an adding-machine, means for moving a type-bearer any distance relative to the printing center, proportionate to the value of the number on the key depressed, comprising a series of key-bars slidingly mounted in a vertical plane, means for elevating said bars, a plate formed on or fixed to each bar and having an inclined surface on its forward lower edge, the acuteness of the incline of each plate being determined by the value of the number borne by the key, a bar mounted adjacent to the key-bars and capable of an oscillating movement, rollers on said bar to be engaged by said inclined plates, and means for connecting said oscillating bar with the type-bearer, for the purposes stated.

9. In a printing attachment for an adding-machine, means for moving a type-bearer any distance relative to the printing center, proportionate to the value of the number on the key depressed, comprising a series of key-bars slidingly mounted in a vertical plane, means for elevating said bars, a plate formed on or fixed to each bar and having an inclined surface on its forward lower edge, the acuteness of the incline of each plate being determined by the value of the number borne by the key, a downwardly-projecting finger on each of said plates at the upper end of the incline, a bar mounted adjacent to the key-bars and capable of an oscillating movement, rollers on said bar to be engaged by said inclined plates, and means for connecting said oscillating bar with the type-bearer, for the purposes stated.

10. In a printing attachment for an adding-machine, means for moving a type-bearer any distance relative to the printing center, proportionate to the value of the number on the key depressed, comprising a series of key-bars slidingly mounted in a vertical plane, means for elevating said bars, a plate formed on or fixed to each bar and having an inclined surface on its forward lower edge, the acuteness of the incline of each plate being determined by the value of the number borne by the key, a bar mounted adjacent to the key-bars and capable of an oscillating movement, rollers on said bar to be engaged by said inclined plates, means for connecting said oscillating bar with the type-bearer, an arm having a segmental rim thereon and pivotally mounted to a fixed support, a series of types slidingly mounted in said rim, a lever fulcrumed to a fixed support, a pitman connected therewith and with the aforesaid oscillating bar, and a rod connecting the lower end of the lever with the arm of the said type-bearing segment.

11. In an adding-machine or the like, the combination of an arm pivoted to a fixed support to move in an arc, a lever fulcrumed to a fixed support, a rod pivoted to the lever and screw-threaded on its opposite ends, a screw seated in the said arm and provided with a screw-threaded opening to admit the said rod, substantially as, and for the purposes stated.

12. In an adding-machine or the like, the combination of an arm pivoted to a fixed support to move in an arc, a screw-threaded opening extended transversely through said arm near its forward edge, a screw-seat therein of a length corresponding to the thickness of the said arm, and having a screw-threaded opening in its edge, a screw-threaded rod designed to be screwed into the opening of the set-screw, and means for oscillating the said rod, to operate the aforesaid arm, for the purposes stated.

13. In a printing attachment for an adding-machine, the combination with a type-bearing segment, comprising an arm pivoted to a fixed support, a segmental rim on its end, a series of types radially mounted in the rim with their lower ends projecting below the rim, means for operating said segment upon a depression of the key-bars, a lever fulcrumed to a fixed support, rollers fixed to the lever adjacent to the key-bars, lugs on the key-bars to engage said rollers, and a straight hammer having a slot therein designed to encircle the shaft on which the type-bearing segment is mounted, and also designed to engage the lower end of said types, substantially as, and for the purposes stated.

14. In an adding-machine having a series of vertically-movable key-bars and a series of adding-wheels having stops thereon, the combination of a lever fulcrumed to a fixed support, rollers thereon, lugs on the key-bars to engage said rollers, means on the opposite end of the said lever for pressing a type against a platen, a rod pivoted to each of said levers, a bell-crank lever fulcrumed to a fixed support and having one end connected with said rod and its other end arranged to be brought into engagement with one of the stops on the adding-wheel when any one of the key-bars has been depressed to its full limit.

15. The combination with an adding-machine of a printing device, comprising a series of vertically-movable key-bars, plates fixed thereto, and having inclines thereon, the acuteness of which is determined by the value of the digit on the key, a finger on each plate at the upper end of the plate, a bar suspended from fixed supports and capable of an oscillating movement, rollers on said bar to be engaged by the inclines on said plates, a pitman at the forward end of each bar, a lever fulcrumed to a fixed support having its upper end connected with said pivot, a shaft mounted on the rear face of the machine, a series of arms pivoted to the said shaft, a segmental rim on each arm to extend laterally a slight distance from the arm, a spring for normally holding the arm to its forward limit, a rod for connecting the said lever with said arm, a series of types mounted in each of the said rims, means for holding types to their downward limits, a lever fulcrumed to a fixed support, means whereby one end of the lever is depressed each time one of the key-bars is depressed, a hammer on the opposite end of each of said levers and having a slot therein to encircle the shaft of the aforesaid arms, and having its upper end designed to engage the lower ends of the types, a device for inking the types, a roller-platen, and means for holding a roll of paper on the machine, and for holding a sheet of paper to the platen, all arranged and combined substantially in the manner set forth, and for the purposes stated.

THOMAS A. TRENT, JR.

Witnesses:
F. M. STACY,
J. C. PARRISH.